United States Patent [19]
Chieu et al.

[11] Patent Number: 5,777,561
[45] Date of Patent: Jul. 7, 1998

[54] METHOD OF GROUPING RF TRANSPONDERS

[75] Inventors: Trieu Can Chieu, Scarsdale; Thomas Anthony Cofino, Rye; Harley Kent Heinrich, Brewster, all of N.Y.; Paul Jorge Sousa, Peabody, Mass.; Li-Cheng Richard Zai, Ossining, N.Y.

[73] Assignee: International Business Machines Corporation, Armonk, N.Y.

[21] Appl. No.: 720,598

[22] Filed: Sep. 30, 1996

[51] Int. Cl.$^6$ .................................................. H04Q 1/00
[52] U.S. Cl. .................................. 340/825.54; 342/42
[58] Field of Search .................... 340/825.54, 572, 340/573; 342/42

[56] References Cited

U.S. PATENT DOCUMENTS

| | | | |
|---|---|---|---|
| 4,636,950 | 1/1987 | Caswell | 340/825.54 |
| 4,673,932 | 6/1987 | Ekchain | 340/825.54 |
| 5,214,410 | 5/1993 | Verster | 340/572 |
| 5,410,315 | 4/1995 | Huber | 342/42 |
| 5,550,547 | 8/1996 | Chan | 342/42 |
| 5,588,005 | 12/1996 | Ali | 340/825.54 |
| 5,606,323 | 2/1997 | Heinrich | 340/825.54 |
| 5,673,037 | 9/1997 | Cesar | 340/825.54 |

*Primary Examiner*—Brian Zimmerman
*Attorney, Agent, or Firm*—Rodney T. Hodgson

[57] ABSTRACT

A method of selecting groups of radio frequency RF transponders (tags) for communication between a base station and the tags. The tags are selected into groups according to a physical attribute of the signal sent by the tags to the base station, or according to the physical response of the tags to a physical attribute of the signal sent from the base station to the tags. Communication with the tags is thereby simplified, and the time taken to communicate with the first tag is markedly reduced.

28 Claims, 7 Drawing Sheets

METHOD OF GROUPING RF TRANSPONDERS

FIELD OF THE INVENTION

The field of the invention is the field of Radio Frequency (RF) Transponders (RF Tags), wherein a Base Station sends power and information to one or more RF Tags which contain logic and memory circuits for storing information about objects, people, items, or animals associated with the RF Tags. The RF Tags can be used for identification and location (RFID Tags) of objects and to send information to the base station by modulating the load on an RF Tag antenna.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by W a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology.

U.S. Pat. No. 5,214,410, hereby incorporated by reference, teaches a method for a base station to communicate with a plurality of Tags . The tags having a particular code are energized, and send a response signal at random times. If the base station can read a tag unimpeded by signals from other tags, the base station interrupts the interrogation signal, and the tag which is sending and has been identified shuts down. The process continues until all tags in the field have been identified. If the number of possible tags in the field is large, this process can take a very long time. The average time between the random responses of the tags must be set very long so that there is a reasonable probability that a tag can communicate in a time window free of interference from the other tags.

RELATED APPLICATIONS

Copending patent applications assigned to the assignee of the present invention and hereby incorporated by reference, are:

Ser. No. 08/303,965 filed Sep. 9, 1994 entitled RF Group Select Protocol, by Cesar et. al. now U.S. Pat. No. 5,673,037;

Ser. No. 08/304,340 filed Sep. 9, 1994 entitled Multiple Item RF ID protocol, by Chan et. al. now U.S. Pat. No. 5,550,547;

Ser. No. 08/521,898 filed Aug. 31, 1995 entitled Diode Modulator for RF Transponder by Friedman et al. now U.S. Pat. No. 5,606,323;

application submitted Aug. 9, 1996 entitled RFID System with Broadcast Capability by Cesar et al.; and application submitted Jul. 29, 1996 entitled RFID transponder with Electronic Circuitry Enabling and Disabling Capability, by Heinrich et al.

These applications teach a communications protocol whereby a base station communicates to a plurality of tags by polling the tags and shutting down tags in turn until there is just one left. The information is then exchanged between the base station and the one tag, and then the one tag is turned off The unidentified tags are then turned on, and the process is repeated until all the tags have the communication protocol completed. Typical protocols requires a time which is not linearly proportional to the number oftags in the field. More tags take a longer time per tag than fewer tags. If the tags can be selected into groups in some way, each group can be dealt with in a shorter time per tag, and the time taken to communicate with the first tag is markedly shortened.

SUMMARY OF THE INVENTION

The method of the present invention is a method of selecting groups of RF tags for a communication protocol comprising selecting a plurality of groups of tags according to a physical attribute of the signal sent by the tags to the base station, or selecting the groups according to the physical response ofthe tags to a physical attribute of the signal sent from the base station to the tags, and communicating with the tags in each group. A single tag may be a member of one or more groups. Some groups may have no members. The most preferred embodiment of the invention is the method of selecting groups on the basis of the physical signal strength of the RF signal received from the tags by the base station. The tags have greater or less received signal strength depending on the distance to the base station antenna, the relative orientation of the tag and the base station antennas, and the local conditions of reflectors and absorbers of radiation around the tag. The base station may also select groups of tags according to the polarization or the phase of the returned RF signal the RF carrier or Doppler shifted RF carrier or modulation frequency sent by the tags, or any another physical signal from the tags. The base station may also select groups of tags according to the physical response of the tags to the polarization, phase, carrier frequency, modulation frequency, or power of the RF signal sent by the base station. The communication protocol can be carried out simultaneously or sequentially with the selected groups. The physical characteristics used to group the tags can be measured simultaneously or sequentially. Different groups may be selected by taking the union, the intersection, or other combinations of the various groups of tags selected according to the different physical attributes. The tag group selection parameters may also include selecting groups by software, i.e. by selecting the groups according to information stored on the tag.

DETAILED DESCRIPTION OF THE INVENTION

Figure 1:
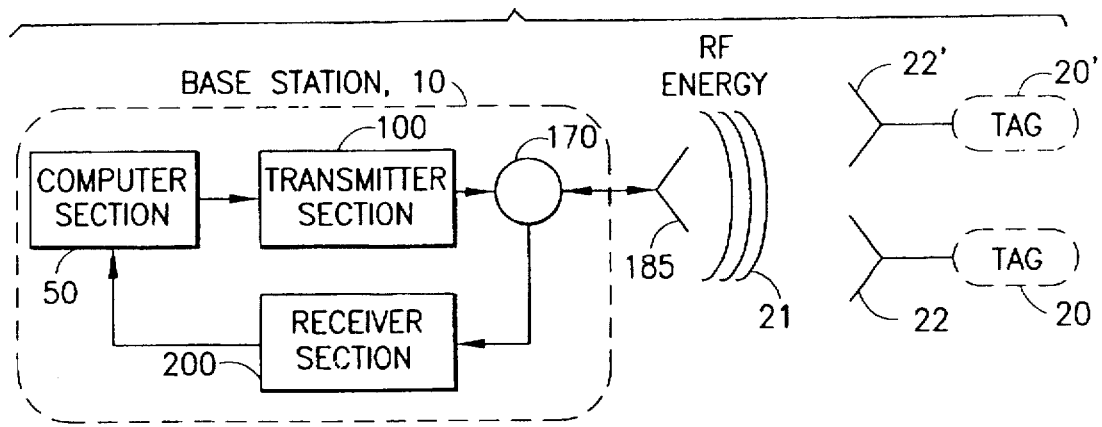
FIG. 1 is a generalized diagram of a base station communicating to one or more tags.

FIG. 1 sketches a base station 10 sending RF energy 21 and information to one or more tags 20. The tags 20 may have varying distances from the base station, and the tag antennas 22 may be in any orientation with respect to the base station antenna. The base station comprises a transmitter section 100, a computer section 50, a circulator 170, a receiver section 200, and one or more antennas 185.

Figure 2:
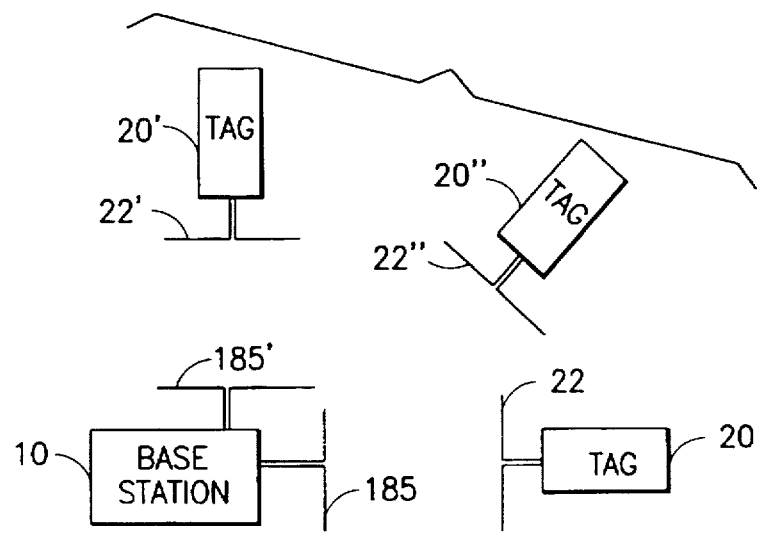
FIG. 2 is a diagram of a base station having two antennas for receiving information about the polarization of the signal sent by a tag.

FIG. 2 depicts a base station 10 which can group the tags 20 into groups on the basis of polarization of the RF radiation back scattered to the base station 10. The base station 10 has two perpendicular antennas 185 and 185' communicating with three tags 20, 20', and 20". The antennas 185 and 185', and 22, 22' and 22" are depicted as simple dipole antennas which transmit linearly polarized radiation with the polarization substantially parallel to the antennas. In the diagram shown, antenna 185 may communicate well with the tag 20 having an antenna 22 parallel to antenna 185, less well with the antenna 22" which is shown having a 45 degree orientation with respect to antenna 185, and not at all with the tag with a perpendicular antenna 22'. The groups are first selected on the basis of the response of the tags to the polarization of the signal sent out from the base station. In this example, two groups are selected: those tags which respond to the particular polarization, and those tags which do not respond. In the embodiment depicted in FIG. 2, a signal sent out from antenna 185 brings responses from tag 20 and from tag 20" to antenna 185, and from tag 20" alone to antenna 185'. The tag antenna 22' may not receive power from the perpendicular antenna 185, and so tag 20' remains silent. The tags are then further selected into subgroups according to the polarization of the returned signal. Thus, three groups of tags are selected by this method in this example. tag 20' is in one group of "silent" tags, tag 20" is in the group which is picked up by antenna 185' because the polarization of the signal from tag 20" can be detected by antenna 185', and tags 20 and 20" are in the group with polarization components which may be picked up by antenna 185. Communication with each of the two "non silent" groups in turn or in parallel simplifies and speed the communication protocol. In particular, the time taken to communicate with the first tag is markedly reduced. In the example given above, the signal returned to antenna 185' is the signal from only a single tag 20", and that tag can return the tag identification number while the antenna 185 receives signal signifying more than one tag in the field. The tag 20" may then be turned off for the duration of the communication procedure, and the process repeated to identify and shut down tag 20. The sending antenna is then switched to antenna 185', and the remaining tag 20' is identified. While a linear polarization scheme is shown as an example, it is clear to one skilled in the art that circularly polarized signals could also be used with good effect. The exact orientations of the antennas are also not critical to the invention, as long as there is a difference in the sensitivity of the antennas to the polarization of the RF signals sent by the tags. A single base station antenna could be used, as long as the polarization characteristics of the single base station antenna could be changed by the base station or by other means.

Figure 3:
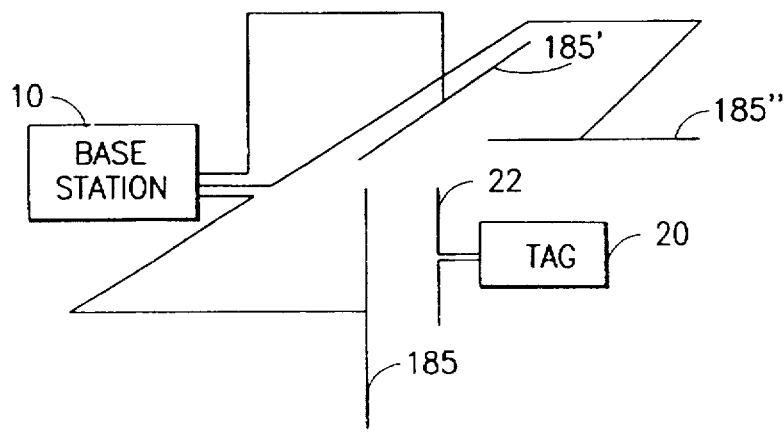
FIG. 3 is a diagram of a base station having three antennas for receiving information about the polarization and phase position of the signal sent by a tag.

FIG. 3 shows a base station 10 with more than two dipole antennas 185, 185', and 185". In this example, each antenna axis is mutually orthogonal so that the orientation of the linearly polarized backscattering from dipole antennas 22 in the field can be measured and the tags selected into groups for the communication procedure.

Figure 4:
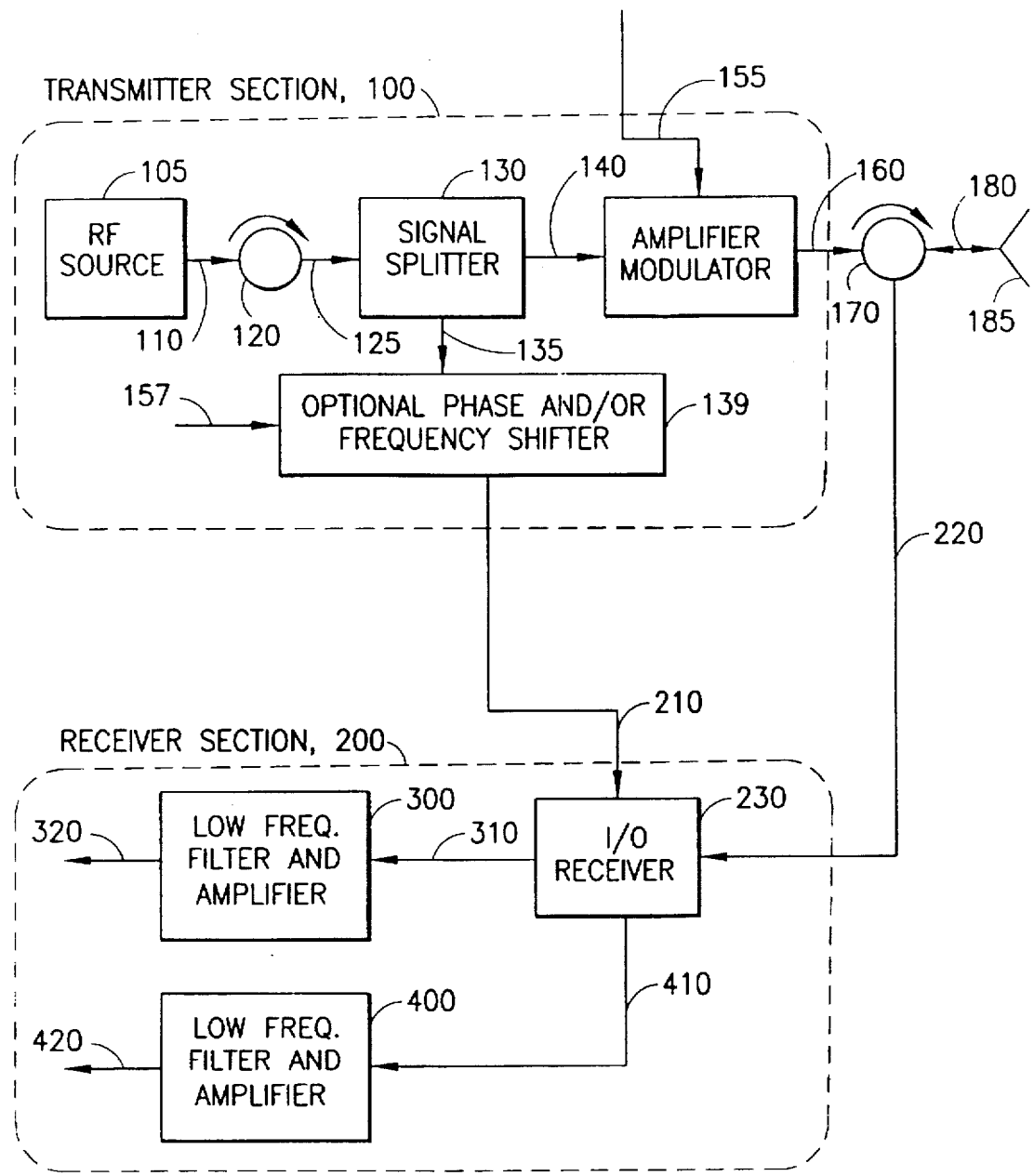
FIG. 4 is a diagram of a base station circuit which can select the strongest signals from signals sent by a plurality of tags.

FIG. 4 shows a block diagram for circuitry which can allow the base station to select a group of tags by the signal strength received at the base station. The equipment for implementing the method of the most preferred embodiment of the invention uses five sections of the base station 10: a computer section 50, a transmitter section 100; a receiver section 200; a hybrid coupling device 170; and an antenna 185. The computer section may be a relatively unsophisticated circuit for controlling the transmitter and for receiving signals from the receiver, or it could include highly sophisticated workstations for interrogating and writing information to the tags. The transmitter section 100, under control of the computer section 50, sends a signal of the appropriate amplitude and frequency (which may or may not be modulated) to the hybrid 170, which sends the (modulated) signal to the antenna 185. The preferred modulation for communication to and from the tags is amplitude modulation, but it may be either frequency or phase modulation. The antenna 185 both sends out the RF carrier frequency which may or may not be modulated, and captures the signals radiated by the tags 20. The antenna 185 captures the signals radiated by the tags and sends the signals back to the hybrid 170, which sends the signals to the receiver section 200. The receiver section down converts and extracts the modulated signal from the carrier, and converts all the modulation energy it receives to a baseband information signal at its output. In the most preferred embodiment, the receiver has two outputs in quadrature called I (in phase with the transmitted carrier) and Q (quadrature, 90 degrees out of phase with the carrier). However, various embodiments of the invention have just one output. The hybrid element 170 connects the transmitter and receiver to an antenna while simultaneously isolating the transmitter and the receiver from each other. That is, the hybrid allows the antenna to send out a strong signal from the transmitter while simultaneously receiving a weak backscattered reflection. The strong transmitted signals being sent into the antenna must be eliminated from the receiver by the hybrid.

The transmitter section depicted by block 100 provides the energy and frequency signals for the transmitter carrier and the receiver down converter, and the amplified and modulated signal 160 which may be sent by the antenna 185. The RF source 105 of signal 110 is usually isolated by an element 120 between the carrier signal source 105 and the rest of the circuit which avoids coupling problems of coupling reflections back to the RF source. The isolation element 120 is usually a circulator with one port terminated by a resistor. The isolated carrier signal 125 is split into two paths in a signal splitter element 130. Most of the energy 140 goes to an amplifier modulator element 150, while signal 135 takes a small signal to the receiver section depicted by block 200. An optional phase and/or frequency shifter element 139 may be included between the signal splitter 130 and the receiver section 200 to provide control by the computer section 50 over line 157 of the reference phase and frequency signal 210 which the receiver section uses in detecting the signals from the tags. The phase and or frequency shifter 139 may send out signals differing by a small amount in frequency from the signal 110 sent out from the RF source 105, or it may send out harmonics of the signal. In the amplifier modulator section 150, the carrier frequency is amplified and modulated by a signal 155 controlled by computer section 50. A preferred embodiment has a carrier frequency greater than 400 MHZ. A more preferred embodiment has a carrier frequency greater than 900 MHZ. The most preferred embodiment uses a carrier frequency offrom 2.3 to 2.5 Ghz, and this signal is amplitude modulated at 20–60 kHz. In the preferred embodiment, a direct modulation of the carrier frequency is depicted. However, an up converter of multiple frequencies may also be used. This modulated signal 160 enters the hybrid element 170 and is passed over lead 180 to the antenna 185. A modulator signal is applied at 155 into the modulator 150 to give a modulation which may be amplitude, frequency or phase modulation. The most preferred embodiment is amplitude modulation.

Inthe receiver section 200, the received signal from the antenna 185 travels along lead 180 and enters the hybrid 170 which directs the signal along 220 to the receiver section depicted by block 200. This signal comprises signals sent by the tags, which modulate the carrier frequency at a frequency of for example, 40 KHz, and the reflected unmodulated transmitter carrier signal reflected from the antennas or other reflectors in the field. The antenna will never be perfectly matched to the transmitter, and will reflect a signal which is about 20 dB down from the signal transmitted by the antenna. Of course, the carrier signals reflected by the tags, and the various reflections of the transmitted signal, will be much weaker than the signal transmitted from the antenna The receiver structure 230 of the most preferred embodiment here is a direct down conversion I and Q system where the mixing frequency signal 210 is generated by the source 105 and is the only send-out by the transmitter. The single down conversion system receiver removes the carrier frequency signal and generates two baseband signals which have frequencies in the 40 KHz region in quadrature 310 and 410. These signals are filtered and amplified by means of signal processing in elements 300 and 400. The signals 320 and 420 are passed to the computer section 50 for further processing.

The hybrid component 170 is typically a circulator. It passes signals from 160 to 180, from A 180 to 220, from 220 to 160 but not the other way around. Hence the transmitter is isolated from both the small amount of modulated carrier reflected by the antenna 185 (20 dB down typically) and the circulator (20 dB leakage typically). The receiver is isolated from the large signal sent from the transmitter 100 to the antenna 185, and receives about −20 dB signal from leakage from the circulator 170 and a further −20 dB of signal from the reflection from the antenna.

Of course, when the base station modulates the carrier signal to transfer information from the base station to the tags, the reflected modulated signals from the antenna and the leakage from the circulator will swamp out any signals sent by the tags. In the prior art, the tags communicate in a time period when there is no modulation of the carrier signal transmitted from the base station, or the tags communicate at a different carrier frequency than that transmitted by the base station, so that the receiver can pick out the modulated signals from the tags from all the reflections and leakages of the carrier signals. The present invention allows simple discrimination of signals by the tag to the base station sent as modulation of the base station carrier frequency, or as modulations of another frequency, from one or more tags, and allows the tags to be sorted in groups determined by the tag signal strength received at the base station.

The most preferred embodiment of the present invention is a method to sort the tags into groups by sending a steady, weak signal modulation at the communication modulation frequency to the tags in the time period where the prior art sends an unmodulated carrier signal so that the tags may communicate back to the base station. The steady, weak modulation frequency is not strong enough to influence the tag, but is strong enough so that the steady, weak modulated signals reflected from the antenna 185 and leaked around the hybrid 170 can be measured by the receiver and can be used to set a level for discriminating amongst the tag signals. In the most preferred embodiment, the communication to the tags is carried out by a 100% amplitude modulation of the carrier frequency at a 20–60 Khz frequency. The preferred protocol for the tags to detect such information is a 50 dB on/offratio, but this is not necessary to the invention. Any modulation of the carrier frequency which can conceivably be used for communication between the tags and the base station can be used. Such modulations as frequency modulation and phase modulation are well known in the art. In the present invention, a modulation amplitude less than that used to communicate with the tags is impressed on the outgoing carrier wave. The mismatch at the antenna will always cause that signal to be reflected and to be present at the receiver. This signal is detected at the receiver and is used to establish a deterministic signal floor. As backscattered modulated signals are received and are stronger than this coupling signal, the received back scattered signal dominates the receiver. Hence, a high sensitivity receiver may be used with a forced coupled modulation from the transmitter as its signal noise floor, and behave in a predictable manner between the conditions of no tags in the field, a single tag in the field, multiple tags in the field, and interference. Furthermore, by varying the modulation strength of the weak, modulated signal, the returned signal strength of signals from the tags required to overcome the coupled modulator signal is increased or decreased thereby allowing the base station to select a group of tags based on the returned signal strength.

Figure 5:
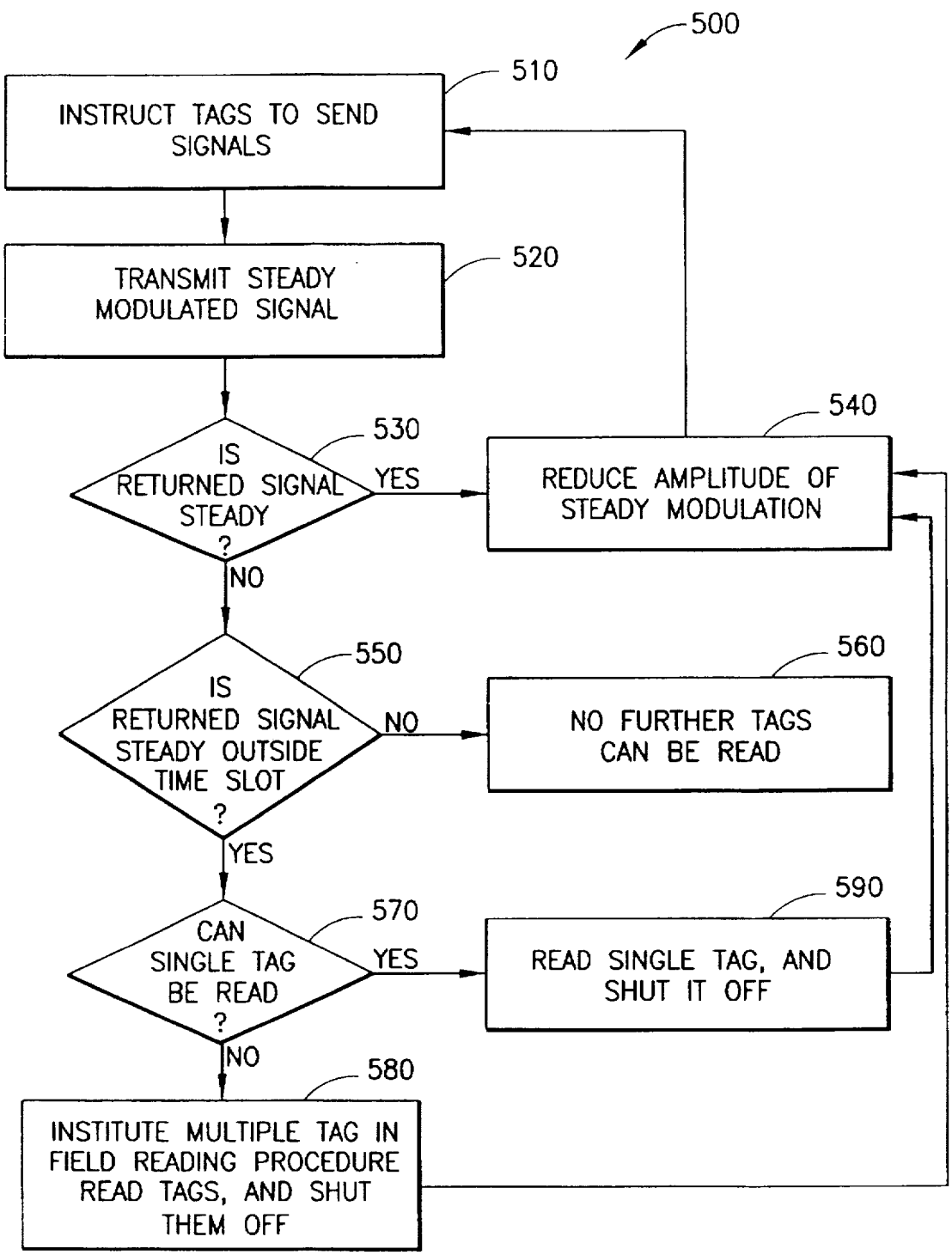
FIG. 5 is a flow chart of the most preferred embodiment of the invention.

Fig.5 depicts a flow chart 500 of the most preferred method for selecting groups of tags and communicating with the tags in each group. A modulation frequency of 40 Khz is chosen as an example. At step 510, the base station transmits a modulated signal to the base station antenna, and hence to the tags, instructing the tags to respond and return a modulated signal in a time period (time slot) defined by the tag communication protocol. At step 520, the base station transmits a carrier wave to the base station antenna. The carrier wave has a steady 40 Khz amplitude modulation which is less than that required to communicate with the tags. The base station measures the 40 KHZ modulation received from the base station antenna in the time slot defined by the tag communication protocol. If the modulated signal received by the receiver 200 is steady in step 530, the reflected modulated signal and leakage is greater than any signals received from tags, which would send an unsteady modulated signal. The base station then reduces the amplitude of the steady modulated signal in step 540 and the system returns to step 510. If the modulated signal is not steady in step 530, the base station checks at step 550 to see whether the modulated signal returned is steady outside the time slot defined by the tag communication protocol. If the modulated signal is unsteady when no tags are supposed to be sending signals, the unsteady signal is noise, and the receiver can not distinguish between signals sent by the tags and the noise. No tags are in reading position in the field, and the protocol is ended in step 560. If however the modulated signal is steady outside the time slot, and unsteady in the time slot, one or more tags in the field are sending signals. These signals are stronger than the steady modulated signals received from the reflected steadily modulated carrier wave. If a single tag is in the field, and can be read at step 570, the single tag is read and instructed to shut off, at step 590, and the system is returned to step 540 to reduce the steady modulation and return to the beginning step 510 to try to find tags with less signal strength. If more than one tag is in the field and the tag signals interfere with each other so that they can not be read at step 570, a multiple tag reading protocol is instituted in order to read the multiple tags at step 580. The tags are read using the multiple tag reading protocol, and ordered to shut down, and the system is returned to step 540 to reduce the steady modulation and return to the beginning step 510 to try to find the group of tags with less signal strength than the first group.

Step 550 is preferably taken after step 530, but step 550 may optionally be taken between steps 570 and 580 or after step 580 if no tags are read by the multiple tag reading procedure.

The most preferred embodiment of the invention uses a protocol in which the tags are commanded to return an identification signal in a particular time slot, but the same invention may be used where the tags are commanded to return information in any defined time periods.

While the preferred embodiment uses the naturally occurring reflections from the base station antenna 185 and leakage from the hybrid 170 to introduce the noise floor signal into the receiver 200, many other means of introducing this signal to the receiver are possible to one skilled in the art. As an example, the steady 40 Khz modulation could be summed with the signals from the I/Q demodulator coming on lines 310 and 410, or indeed a specially constructed device analogous to a two input I/Q demodulator could be constructed to accept the steady 40 Khz comparison signal from an outside source.

Additional embodiments of the invention include further subdividing the groups selected by the above method on the basis of the phase and/or polarization of the signals returned to the base station, as well as other physical or software group selection criteria.

A preferred embodiment of the invention is to select tags on the basis of the returned polrization of the signals. In the embodiment shown in FIG. 2, groups of tags with antennas which return a linear polarization which is polarized more parallel to one or the other of the two dipole antennas 185 or 185' sketched in FIG. 2 are selected. Returned signals from the two antennas are processed in parallel by two sets of receiver circuitry like that shown in FIG. 4. The tags are interrogated by transmitting the modulated carrier signal from first one antenna 185, then the other antenna 185', and four channels of signals (the I and Q channels received from each antenna) may be processed in parallel or in sequential fashion. This set up would select the tags into 8 groups, which of course may be further selected and grouped on the basis of the received signal strength or any other physical or software attribute.

Figure 6:
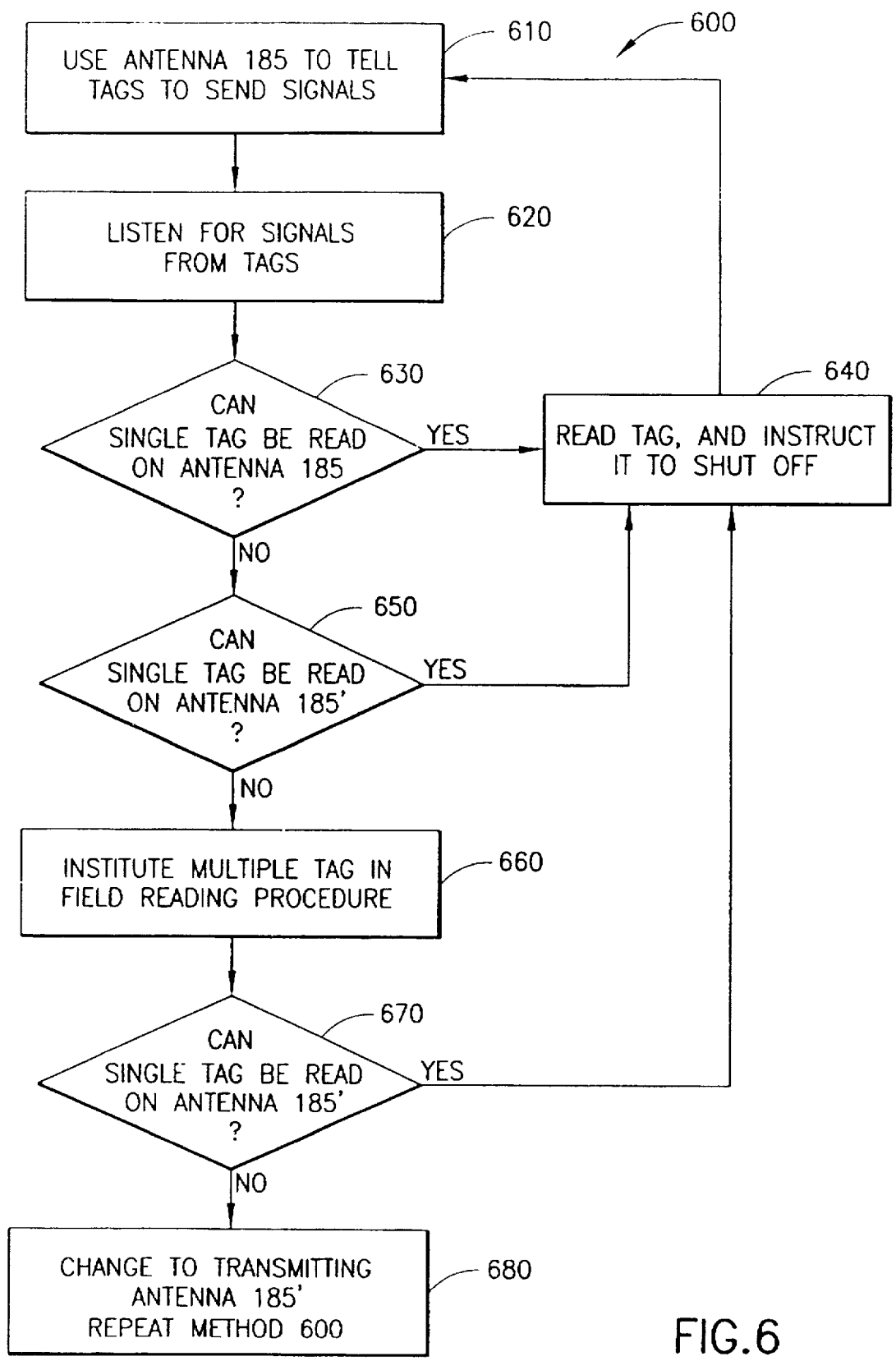
FIG. 6 is a flow chart of a preferred embodiment of the invention.

FIG. 6 depicts a flow chart 600 of the preferred method of selecting groups of tags on the basis of the polarization of the signals returned to the base station. As an illustrative example, a base station comprising 2 antennas which are sensitive to different polarizations, such as depicted in FIG. 2, is chosen. However, the number of antennas and whether the polarization is linear, circular, or some combination of the polariations may be chosen at will by one skilled in the art. Step 610 uses antenna 185 to send a signal to the tags instructing the tags to return a signal in the time slot determined by the communication protocol. The antenna 185 is then used to listen for signals from the tags inthe time slot where thetags return signals in step 620. Signals returning from antenna 185 are analysed in step 630 to see if the base station can read the signal. If the signal is returned from a single tag, the base station communicates with the single tag in step 640, and instructs the tag to shut itself down for the remainder of the communication protocol, or until it is specifically instructed to start returning signals again. The system is then returned to step 610 to look for more tags. If the signal returned by the tags to antenna 185 can not be read, either because there are no tags in the field in a position to be read by antenna 185 or because there multiple tags trying to communicate at the same time, the system may then try to read a single tag communicating to antenna 185' in step 650. If a single tag is successfully read, the system reads the tag at step 640, shuts the tag down, and returns to the beginning step 610 to try to read again the tags which may be trying to communicate to antenna 185. Since there is now one fewer tag in the field, a tag may now be read at step 630 on antenna 185. If a single tag can not be read in step 650, a multiple tag in the field reading procedure is instituted in step 660. Steps 630 and 650 may be taken either sequentially or simultaneously, if two receivers are connected to the two antennas. If tags are read using one antenna in step 660, the system decides in step 670 to communicate with the tags and turn them off and the system returns to step 610 to try to read a single or multiple tag from the other antenna. If the multiple tag reading procedure does not read any tags from either antenna in step 660, the system may switch transmitting antennas in step 680, so that the commands and carrier wave are transmitted to antenna 185' instead of antenna 185. The method 600 of the invention can then be used to identify and select other groups not found in the first application of method 600. Alternatively, the system may switch transmitting antennas between steps 650 and 660 to try to find, communicate with, and shut off single tags.

Another antenna perpendicular to the two antennas shown in FIG. 2, which is placed remotely from the base station as shown in FIG. 3 allows all combinations of linear polarized backscattering to be discriminated and allows the selecting of groups based on all polarizations of the received signal.

The three antennas 185, 185', and 185" shown in FIG. 3 allow many more groups to be selected on the basis of phase information. A possibly different group responds in the I and Q channels of the receiver of each antenna, and the groups may be different depending on which antenna or combination of antennas sends the carrier signal to the tags. Such group selection markedly cuts down the time needed to interrogate many tags in the field.

Base station antennas and tag antennas sensitive to circular and other polarizations are also known in the art, and these also may be used by one skilled in the art in an analogous way to that shown in FIGS. 1, 2, and 3 and described above.

An additional preferred embodiment of the invention is to use the information on the I and Q channels to select tags into groups on the basis of the phase of the returned signal which is dependent on the distance of the tags from the base station. As a tag is moved away from the base station, the carrier signal from the tag received at the base station changes from being in phase with the transmitted signal to being 90 degrees out of phase to being 180 degrees out of phase as the tag is moved one quarter of a wavelength of the RF EM field. The amplitude in the I channel and the Q channel changes accordingly, for example from a 1 in the I channel and a 0 in the Q channel, to a 0 in the I channel and a 1 in the Q channel, to a −1 in the I channel and 0 in the Q channel respectively. Thus, selecting the signals received from the tags on the I channel alone selects a group of tags for communication, while selecting the signals received from the tags on the Q channel selects a different group of tags which are at different distances from the base station antenna. Both the I and the Q channels may be used simultaneously or sequentially to communicate with the two different groups of tags. It is possible that some tags may be in both groups at the same time. As long as there are some tags in one group and not in the other, the selecting of the groups speeds up the tag communication protocol.

Figure 7:
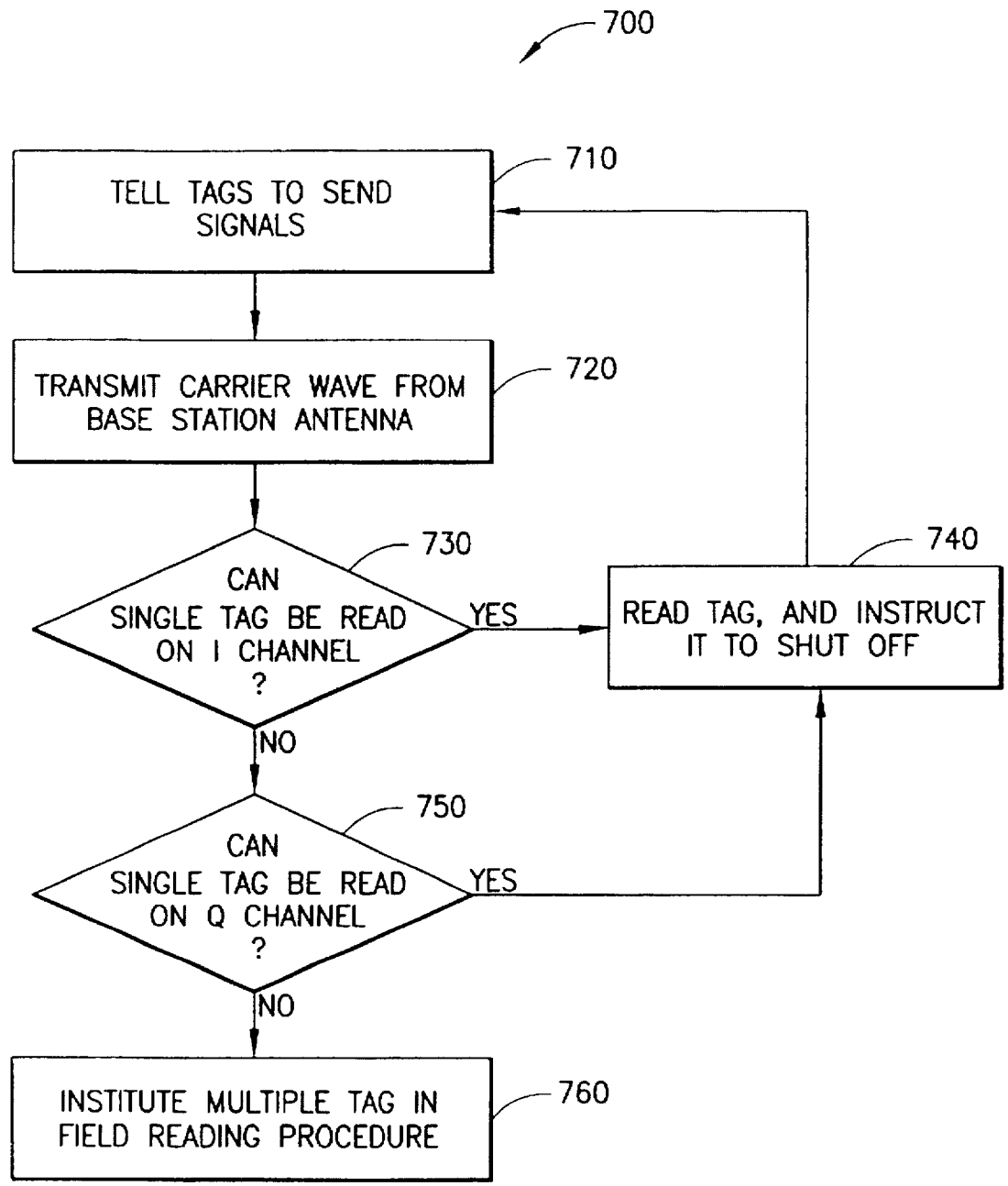
FIG. 7 is a flow chart of a preferred embodiment of the invention.

FIG. 7 gives a flow chart of a preferred method 700 of selecting groups of tags by the phase of the signal returned to the base station. A signal 710 is sent from the base station to the tags instructing the tags to return modulated signals to the base station in the time slot designated for tag response. In this time period, a steady carrier wave having a defined phase is transmitted 720 from the base station antenna. If a single tag can be read on the receiver I channel 730, the tag is instructed to shut itself off in step 740 and the system returns to step 710. If a single tag can not be read on the I channel in step 730, the system tries to read a single tag in the Q channel in step 750. If a single tag can be read step 750, the tag is instructed to shut itself off in step 740, and the system returns to the beginning 710 to try to pick up a single tag in the I channel. If single tags can not be read in either the I channel or the Q channel, the system decides in step 750 to institute the multiple tag in field reading procedure 760. If tags are identified in either I or Q channels in step 760, the system may shut the identified tags off and return to step 710 to try to find single tags grouped in the other channel.

While the above method 700 has steps 730 and 750 proceeding sequentially, it is well within the scope of the invention that steps 730 and 750 may also be carried out simultaneously. If a single tag is read on either the I channel or the Q channel, the system returns to step 710. If no single tags are read on steps 730 and 750, the system proceeds to step 760. In step 760, if tags are identified and shut off, the system may at any time return to step 710 to carry out the simpler subgrouping.

With the addition of an optional phase shifting element 139, signals from a particular tag are brought entirely into the I channel or the Q channel. The tags may then be sorted into many more groups than the two groups defined by the I and Q channels as explained above. If only one channel of information, for example the I channel, is used, changing the phase shifting element 139 to give a series of different phase delays may sort the tags into more groups. The computer section 50 may end the phase shift element 135 instructions over line 157 to shift phase by, for example 0, 30, 60, and 90 degrees which would select four different groups of tags for communication. Using both the I and Q channels, and 3 phase shifts of 0, 30, and 60 degrees gives 6 groups as another example.

Figure 8:
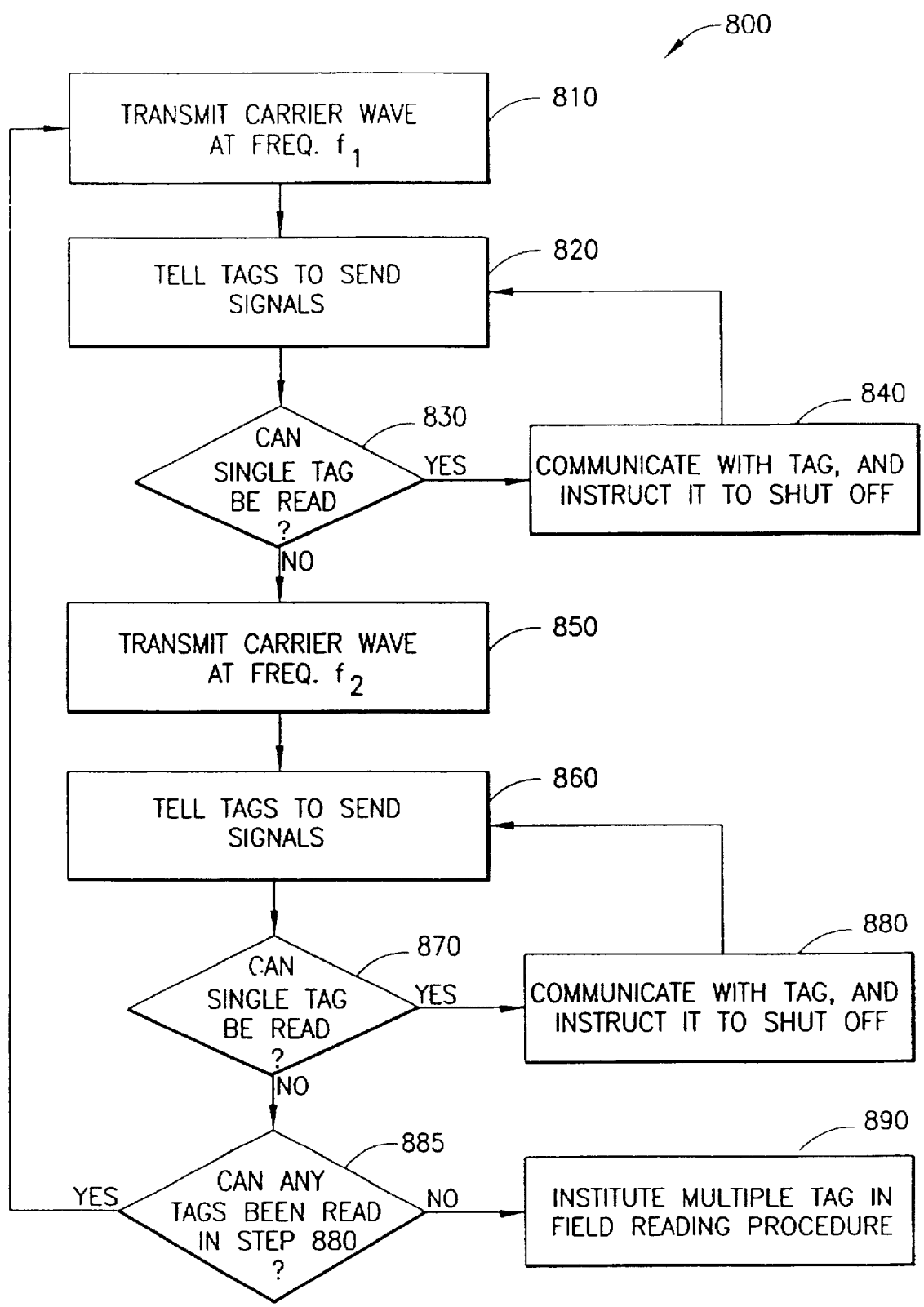
FIG. 8 is a flow chart of a preferred embodiment of the invention.

If the carrier signal frequency sent out from the base station is changed, a particular tag will be a different number of quarter wavelengths from the base station and the signal will be distributed in a different way between the I and Q channels of the base station receiver. A preferred embodiment of the present invention is to select different groups of tags according to the response of the tag to such a frequency shift of the base station. FIG. 8 gives a flow chart for the method 800 of selecting groups of tags on the basis of the response of the tag to the frequency of the carrier signal sent out from the base station. In step 810, the base station sends out a carrier wave having a first frequency $f_1$. In step 820, the base station instructs the tags to return signals. The signal returning to the base station is analyzed in a single channel of the receiver in step 830. If the signal can be read, the tag is communicated with and turned off in step 840 and the system returns to step 820 to find single tags which may have less received signal strength than the tag found in the previous cycle. If no tag is found in step 830, the system then changes the carrier frequency sent out from the base station in step 850 to a frequency $f_2$, and then sends signals to the tags to return signals in step 860. If single tag can be read in step 870, the tag is communicated with and shut off in step 880, and the system returned to step 860. If no tags are found in step 870, the system checks to see if any tags have been found in previous cycles through step 870, and if so the system is returned to the beginning step 810 to search the first frequency again. If no tags have been found in previous cycles, the system goes to the multiple tag in the field search procedure 890. While two frequencies are used in this example, the method is not limited to the use of just two frequencies, and many more could be used. Use of any plurality of frequencies which shift the relative phase of the returned signal is contemplated by the inventors.

A further embodiment of the invention is to select the tags into groups on the basis of the frequency response of the tags. Tags responsive to different carrier frequencies are interrogated, and the base station is programmed to shift from one frequency to the next to select and interrogate these different groups of tags in a sequential fashion. Tags may be grouped into tags which respond to 900 MHZ, and tags which respond to 2.4 MHZ, as an example.

A further embodiment of the invention is to select the tags into groups on the basis of the response of the tags to the RF power transmitted from the base station. The method of the embodiment is to send a low power to the set of tags, and communicate with the set of tags which respond to the low power, then turn the tags which responded to the low power off. Next, the RF power transmitted from the base station is raised, and tags in a group which are further away than the first group respond, and are in turn communicated with and turned off The process may be repeated until all tags in communication range of the base station with the maximum power allowed have finished the communication protocol.

Tags which themselves return different carrier frequencies than the base station carrier frequency are known in the art. A further embodiment of the invention is to select groups of such tags on the basis of the different measured carrier frequencies. The base station is programmed to receive the different tag carrier frequencies, either simultaneously or sequentially and to interrogate each group of tags. The different carrier frequencies known in the art are often the harmonics of the base station carrier frequency. However, the invention is not limited to the particular carrier frequency returned by the tags to the base station. If the tags can be selected into at least two groups, the communication protocol is speeded up.

Figure 9:
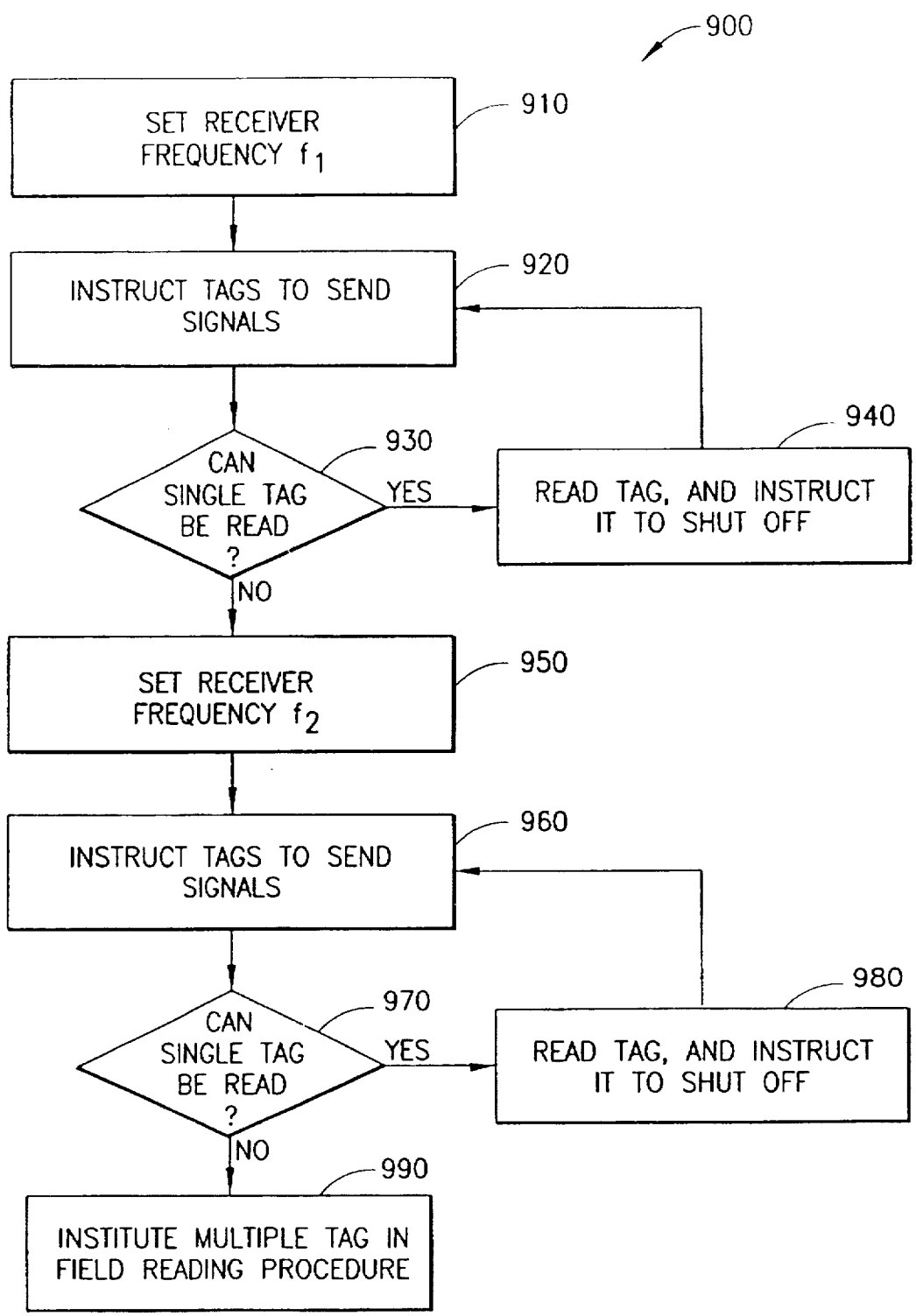
FIG. 9 is a flow chart of a preferred embodiment of the invention.

FIG. 9 is a flow chart of a method of grouping the tags on the basis of the carrier frequency of the tags. The receiver is set to receive a carrier signal of frequency f, in step 910. Step 920 instructs the tags to return signals. If a single tag is read in step 930, the system instructs the tag in step 940 to turn off and return to step 920. If no tag can be read in step 930, the receiver frequency is changed in step 950 to $f_2$, and the tags are instructed in step 960 to return signals. If a single tag can be read in step 970, the tag is communicated with and shut off in step 980. If a single tag can not be read in step 970, the multiple tag reading protocol is instituted. While two frequencies are used in this example, many more frequencies could also be used.

The carrier frequencies emitted by the tags and received by the base station may be apparently shifted from the base station carrier frequency by the Doppler shift due to the relative motion of the tags and the base station. A further embodiment of the invention is to select groups of tags according to the Doppler shift of the carrier frequency sent by the tags and received by the base station. As an example, two groups of tags, those with relative motion of the tags towards the base station, and those with relative motion away from the base station, are selected for the communication protocol. This group selection is particularly valuable for a base station communicating with tags on one side of a doorway, for example, to measure whether the tags are carried into or out of a room.

Tags may return different modulation frequencies. A further embodiment of the invention is to select groups oftags on the basis of the modulation frequency of the returned tag signal. The base station is programmed to interrogate each group of tags either simultaneously or sequentially.

The invention is not limited to the above examples. The selection of groups of tags from a set of tags on the basis of any physically measured characteristics or attributes of the returned signal from the tags in response to any physical characteristic or attribute of the signal sent from the base station is well within the scope of the invention, as is the combination of the selection of groups on the basis of both physically measured characteristics and information contained on the tags.

We claim:

1. A method for communicating between a base station and a set of radio frequency (RF) transponders (tags), comprising;
   selecting a plurality of groups of tags from the set of RF tags, the selection according to a physical attribute of the response of the tags to a first RF signal sent from the base station; and
   communicating with tags in each group.

2. The method of claim 1, wherein the communication with tags in each group is simultaneous.

3. The method of claim 1, wherein the physical response of the tags is a polarization of a second RF signal returned by the tags, the second RF signal received by the base station.

4. The method of claim 3, wherein the communication with tags in each group is simultaneous.

5. The method of claim 3, wherein the selection of groups of tags is by signals received by at least two antennas of the base station.

6. The method of claim 1, wherein the physical response of the tags is a phase of a second RF signal returned by the tags, the second RF signal received by the base station.

7. The method of claim 6, wherein the communication with tags in each group is simultaneous.

8. The method of claim 6, wherein the phase the signals received from a first group of tags is primarily in phase with a carrier signal sent out from the base station, and the phase of the signals received from a second group of tags is primarily 90 degrees out of phase with the signal sent out from the base station.

9. The method of claim 1, wherein the physical response of the tags is a frequency of a second RF signal returned by the tags, the second RF signal received by the base station.

10. The method of claim 9, wherein the communication with tags in each group is simultaneous.

11. The method of claim 9, wherein the frequency of the second RF signal received from the tags by the base station is harmonically related to a base station carrier frequency.

12. The method of claim 9, wherein the frequency of the second Rf signal received from the tags by the base station is a base station carrier frequency Doppler shifted by relative motion between the tags and the base station.

13. The method of claim 12, wherein a first group of tags is a group of tags having relative motion towards the base station, and a second group of tags is a group of tags having relative motion away from the base station.

14. The method of claim 1, wherein the physical response of the tags is a modulation frequency of a second RF signal returned by the tags, the second RF signal received by the base station.

15. The method of claim 14, wherein the communication with tags in each group is sequential.

16. The method of claim 1, wherein the physical response of the tags is a signal strength of a second RF signal returned by the tags, the second RF signal received by the base station.

17. The method of claim 16, wherein the communication with tags in each group is sequential.

18. The method of claim 17, wherein the selection of a first group of tags is followed in order by communication with the first group of tags, the selection of a second group of tags, and communication with the second group of tags.

19. The method of claim 18, wherein the signal strength of the second RF signal received from the tags by a receiver of the base station is compared to a signal strength of a third signal introduced by the base station into the receiver of the base station, and wherein the first group of tags is selected to be the group of tags which have signal strengths greater than the signal strength of the third signal.

20. The method of claim 1, wherein the physical response of the tags is a polarization and a phase of a second RF signal returned by the tags, the second RF signal received by the base station.

21. The method of claim 1, wherein the physical response of the tags is a polarization and a signal strength of a second RF signal returned by the tags, the second RF signal received by the base station.

22. The method of claim 1, wherein the physical response of the tags is a phase and a signal strength of a second RF signal returned by the tags, the second RF signal received by the base station.

23. The method of claim 1, wherein the physical response of the tags is a polarization and a phase and a signal strength of a second RF signal returned by the tags, the second RF signal received by the base station.

24. A method for communicating between a base station and a set of radio frequency (RF) transponders (tags), comprising:
   selecting a plurality of groups of tags from the set of RF tags, the selection according to a physical attribute of the response of the tags to a polarization of a first RF signal sent from the base station; and
   communicating with the tags in each group.

25. A method for communication between a base station and a set of RF tags, comprising:
   I) transmitting a carrier wave with a first modulated signal to a base station antenna, the first modulated signal instructing the set of tags to return a second modulated signal in a time period (slot) defined by a tag communication protocol; then
   II) transmitting a carrier wave with a steady amplitude modulation to the base station antenna, the steady amplitude modulation being less than an amplitude modulation required to communicate with the set of tags; and
   III) measuring a modulation of a carrier wave received from the base station antenna,
      A) when the modulation of the carrier wave received from the base station antenna is steady, reducing the amplitude of the modulation of the carrier wave with a steady amplitude modulation and returning to step I);
      B) when the modulation of the carrier wave received from the base station antenna is not steady, and
         a) when the modulation can be read, communicating with a first tag and then instructing the first tag to cease sending modulated signals, then reducing the amplitude of the modulation of the carrier wave with a steady amplitude modulation and returning to step I);
         b) when the modulation can not be read, and
            i.) when the modulation of the carrier wave received from the base station antenna outside the communication protocol time slot is steady, communicating with multiple tags using a multiple tag communication protocol, then instructing the multiple tags to cease returning the second modulated signal, reducing the amplitude of the modulation of the carrier wave with a steady amplitude modulation and returning to step I);
            ii.) when the modulation of the carrier wave received from the base station antenna outside the communication protocol time slot is not steady, stopping.

26. A method for communication between a base station and a set of RF tags, comprising:
   a) transmitting a first modulated signal to a base station antenna, the first modulated signal instructing the set of tags to return a second modulated signal in a time period (slot) defined by a tag communication protocol; then
   b) transmitting an unmodulated first carrier wave having a defined first phase to the base station antenna during the time slot defined by a tag communication protocol; then
   c) measuring a second modulated signal of a second carrier wave returned by the tags to the base station antenna in the time slot defined by the tag communication protocol, the second carrier wave having a second defined phase with respect to the first phase of the first carrier wave, and communicating with a first group of tags producing the modulated second carrier wave; and
   d) measuring a third modulated signal of a third carrier wave returned by the tags to the base station antenna in the time slot defined by the tag communication protocol, the third carrier wave having a third defined phase with respect to the first phase of the first carrier wave, and communicating with a second group of tags producing the modulated third carrier wave.

27. The method of claim 26, wherein steps c) and d) are carried out simultaneously.

28. The method of claim 26, wherein steps c) and d) are carried out sequentially.

* * * * *